(12) United States Patent
Sasaki

(10) Patent No.: US 7,986,349 B2
(45) Date of Patent: Jul. 26, 2011

(54) RECORDING DEVICE, REPRODUCING DEVICE, IMAGE FILE GENERATING METHOD, AND DISPLAY CONTROLLING METHOD

(75) Inventor: Teruhiko Sasaki, Chiba (JP)

(73) Assignee: Sony Corporation, Tokyo (JP)

( * ) Notice: Subject to any disclaimer, the term of this patent is extended or adjusted under 35 U.S.C. 154(b) by 707 days.

(21) Appl. No.: 11/292,169

(22) Filed: Nov. 30, 2005

(65) Prior Publication Data

US 2006/0127079 A1 Jun. 15, 2006

(30) Foreign Application Priority Data

Nov. 30, 2004 (JP) ................ P2004-346498

(51) Int. Cl.
- H04N 5/76 (2006.01)
- H04N 5/222 (2006.01)
- G11B 21/08 (2006.01)
- G11B 5/86 (2006.01)

(52) U.S. Cl. ............. 348/231.2; 348/231.99; 348/231.3; 348/231.4; 348/333.01; 348/333.02; 369/30.04; 369/30.1; 369/30.12; 360/15

(58) Field of Classification Search .......... 348/232, 348/231.99, 231.1–231.4, 333.01–333.02; 396/105; 369/30.04, 30.05, 30.08, 30.1–30.12, 369/47.13, 47.16, 47.34

See application file for complete search history.

(56) References Cited

U.S. PATENT DOCUMENTS

| | | | | |
|---|---|---|---|---|
| 5,731,852 A * | 3/1998 | Lee | | 348/719 |
| 5,812,736 A * | 9/1998 | Anderson | | 386/324 |
| 6,334,025 B1 * | 12/2001 | Yamagami | | 386/96 |
| 6,408,301 B1 * | 6/2002 | Patton et al. | | 707/741 |
| 6,594,442 B1 * | 7/2003 | Kageyama et al. | | 386/253 |
| 7,167,635 B1 * | 1/2007 | Ando et al. | | 386/96 |
| 7,474,835 B2 * | 1/2009 | Kimura | | 386/96 |
| 7,669,131 B2 * | 2/2010 | Matsuyama | | 715/730 |
| 7,884,851 B2 * | 2/2011 | Heymann | | 348/207.99 |
| 2002/0021362 A1 * | 2/2002 | Ejima et al. | | 348/232 |
| 2002/0063783 A1 * | 5/2002 | Kurase | | 348/232 |
| 2004/0041934 A1 * | 3/2004 | Shibutani | | 348/333.01 |
| 2004/0109677 A1 * | 6/2004 | Seo et al. | | 386/95 |
| 2004/0136244 A1 * | 7/2004 | Nakamura et al. | | 365/200 |
| 2004/0189827 A1 * | 9/2004 | Kim et al. | | 348/231.4 |
| 2004/0201688 A1 * | 10/2004 | Wolf et al. | | 348/207.1 |
| 2005/0117475 A1 * | 6/2005 | Abe et al. | | 369/47.15 |
| 2006/0066732 A1 * | 3/2006 | Heymann | | 348/231.4 |
| 2007/0257994 A1 * | 11/2007 | Sakamoto et al. | | 348/231.4 |

FOREIGN PATENT DOCUMENTS

| | | | |
|---|---|---|---|
| JP | 2000-322873 A | 11/2000 | |
| JP | 2004-295994 A | 10/2004 | |

* cited by examiner

*Primary Examiner* — Jason Chan
*Assistant Examiner* — Michael Osinski
(74) *Attorney, Agent, or Firm* — Wolf, Greenfield & Sacks, P.C.

(57) ABSTRACT

A recording device including: a recorder recording data onto a recording medium on which tracks as units of audio data are grouped and managed by management information; and a controller generating an image file in which image data associated with one of each track recorded on the recording medium and each group managed by the management information is collected, and recording the image file onto the recording medium by the recording means.

20 Claims, 8 Drawing Sheets

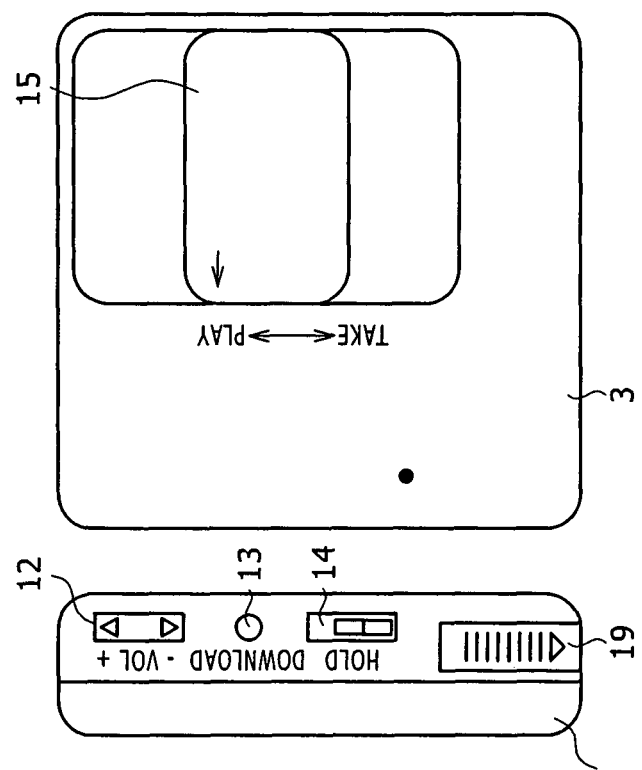
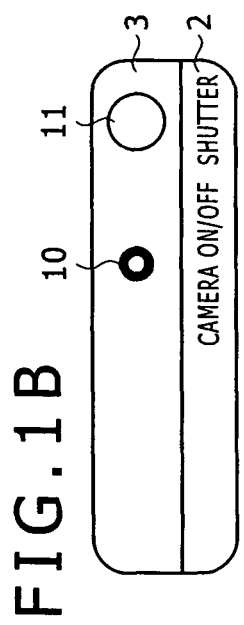
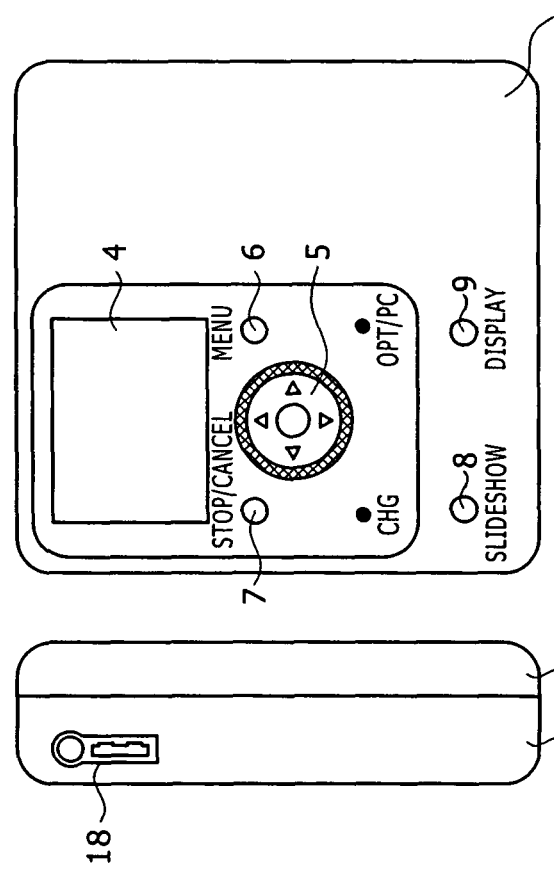
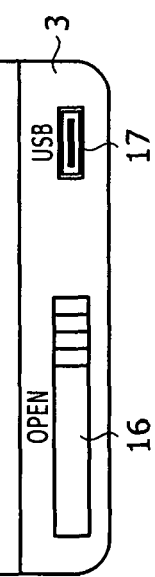

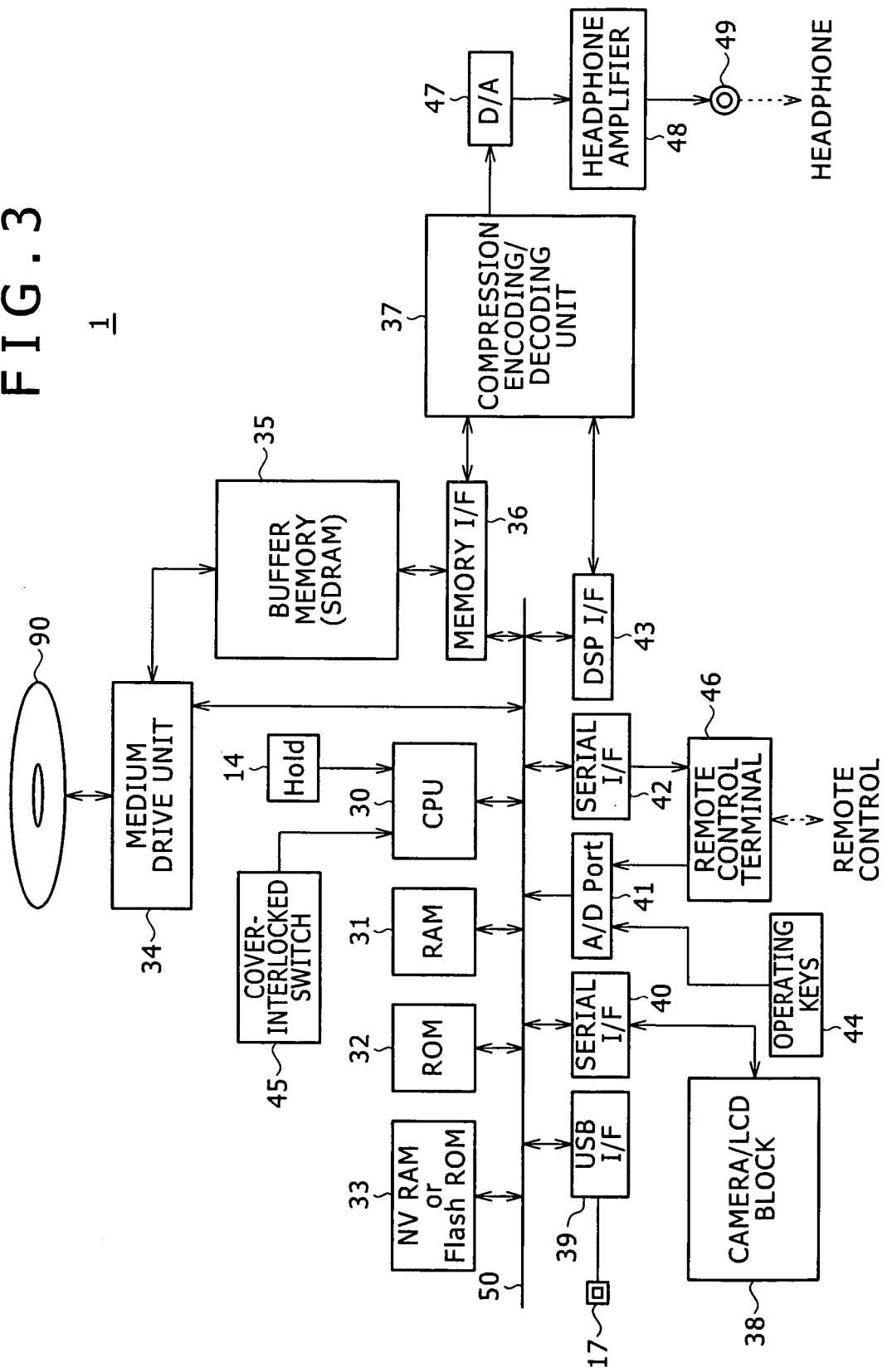

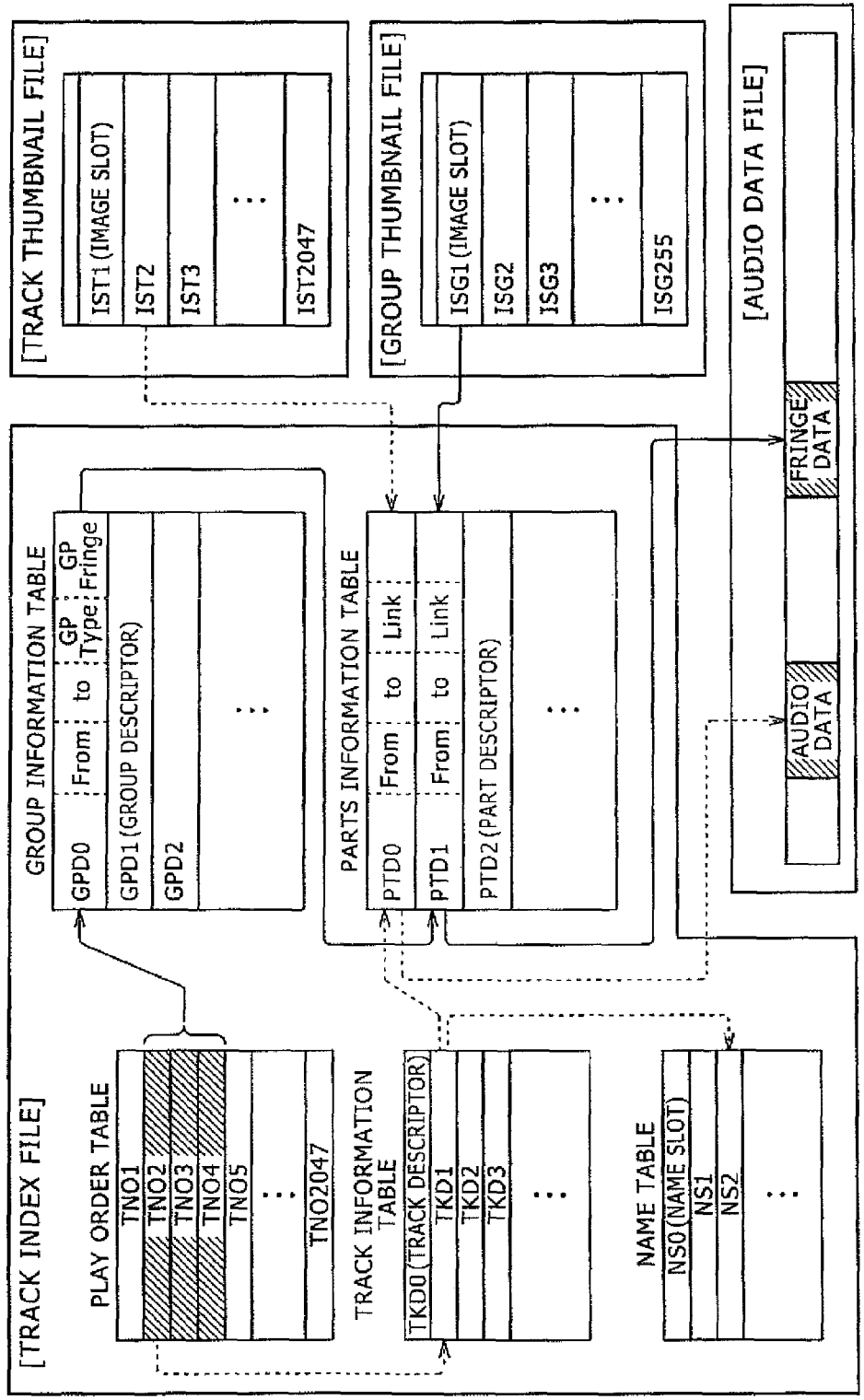

STRUCTURE OF THUMBNAIL FILE

STRUCTURE OF IMAGE SLOT

RECORDING DEVICE, REPRODUCING DEVICE, IMAGE FILE GENERATING METHOD, AND DISPLAY CONTROLLING METHOD

CROSS REFERENCES TO RELATED APPLICATIONS

The present invention contains subject matter related to Japanese Patent Application 2004-346498 filed with the Japanese Patent Office on Nov. 30, 2004, the entire contents of which being incorporated herein by reference.

BACKGROUND OF THE INVENTION

The present invention relates to a recording device and an image file generating method of the recording device, and a reproducing device and a display controlling method of the reproducing device.

Digital still cameras are spreading which obtain a subject image signal using a solid-state image pickup element such as a CCD sensor, a CMOS sensor or the like and record the subject image signal as image pickup data onto a recording medium.

As the recording medium for recording the image pickup data (picture data), these digital still cameras use a memory card including a flash memory, or disk media such as an optical disk, a magneto-optical disk, a hard disk (magnetic disk) and the like. In a case of currently common DCF-compliant digital cameras, image pickup data is divided into folders on a FAT system, and recorded on these recording media.

In addition, various disk media such as CDs (Compact Discs), MDs (Mini Discs), DVDs (Digital Versatile Discs), Blu-Ray Discs and the like have been developed, and are used in various systems for recording and reproducing audio data, video data, data for computer use, and the like.

Further, with these disk media increasing in capacity and devices becoming multifunctional, for example, more various electronic devices have been developed.

For example, various kinds of portable small devices as audio reproduction devices using disk media, for example, have spread. Recently, portable audio players having an image display function and a digital camera function have also been developed.

SUMMARY OF THE INVENTION

In a field of digital still cameras using for example a solid-state memory such as a flash memory or the like or a memory card including the solid-state memory as a recording medium, picked-up image data is displayed on a display unit, and a list of thumbnail images is displayed (as seen in Japanese Patent Laid-open No. Hei 11-331702).

On the other hand, it is proposed that audio devices using disk media have an image display function, and display an image corresponding to a track being reproduced (the track in this case refers to a unit of one musical piece, for example) or a group (a set of tracks, and a unit of a music album, for example). For example, album jacket pictures and pictures matching the images of tracks (musical pieces) are recorded on a disk, and these pictures are displayed during reproduction. In addition, in audio devices having a digital camera function, associating image data obtained by image pickup with a track or an album and displaying the image data is also considered. Of course, displaying a list of jacket pictures and sequentially displaying jacket pictures, for example, when audio data reproduction is not performed is also considered.

Consideration will be given in the following to characteristics of systems using optical disk media.

An optical disk system requires sled movement of an optical pickup and accompanying focus/tracking servo control for access for data reproduction of the optical disk system, and thus has a characteristic of taking more time than a solid-state memory. The optical disk system has another characteristic of high power consumption for driving for these operations and disk rotation.

In general, a recent audio reproduction device temporarily stores audio data read from a disk in a buffer memory at high speed, and continuously reads the audio data from the buffer memory at a predetermined rate for reproduction output. As the capacity of the buffer memory increases, a period of reading from the disk is being reduced. That is, when audio data is stored in the buffer memory at high speed, the reading of the audio data from the disk can be stopped for a certain period of time, so that power consumption can be correspondingly reduced.

However, considering reading image data corresponding to audio data from the disk and displaying the image data during reproduction of the audio data, access time and power consumption during disk reproduction present a problem.

That is, the image data is read during intervals between the operations of reading the audio data. A process of sled movement of the pickup and the like at that time increases the access time, and thus inevitably decreases the speed of response in image display.

In addition, the additional reading of the image data from the disk is required, which increases the number of sled movements and increases a disk rotation driving period, so that power consumption is inevitably increased. In a portable device, for example, an increase in power consumption presents a major problem from a viewpoint of battery life.

Further, requiring access to disk media to reproduce image data even when audio data is not being reproduced is disadvantageous in terms of power consumption and display response.

In view of such problems, it is desirable to reduce power consumption for displaying image data and realize display with good response in a recording and reproducing system using a disk recording medium, for example.

According to an embodiment of the present invention, there is provided a recording device including: recording means for recording data onto a recording medium on which tracks as units of audio data are grouped and managed by management information; and controlling means for generating an image file in which image data associated with one of each track recorded on the recording medium and each group managed by the management information is collected, and recording the image file onto the recording medium by the recording means.

The controlling means resizes image data recorded on the recording medium, and includes and records the resized image data as image data associated with one of a certain track and a certain group in the image file.

The controlling means includes correspondence specifying information indicating correspondence to one of a certain track and a certain group in each piece of image data included in the image file, and records each piece of image data including the correspondence specifying information in the image file.

According to an embodiment of the present invention, there is provided a reproducing device including: reproducing means for reproducing data on a recording medium on which tracks as units of audio data are grouped and managed by management information and an image file in which image data associated with one of each recorded track and each group managed by the management information is collected is recorded; buffer memory means for buffering the data reproduced from the recording medium by the reproducing means; displaying means; and controlling means for reading the image file from the recording medium by the reproducing means and storing the image file in the buffer memory means, and when the reproducing means reproduces audio data from the recording medium, extracting image data associated with one of a track to be reproduced and a group including the track to be reproduced from the image file stored in the buffer memory means and making the displaying means display the image data.

Each piece of image data registered in the image file includes correspondence specifying information indicating correspondence to one of a certain track and a certain group; and using the correspondence specifying information, the controlling means extracts the image data associated with one of the track to be reproduced and the group including the track to be reproduced from the image file.

According to an embodiment of the present invention, there is provided an image file generating method including: a file generating step of generating an image file in which image data is registered, the image data being associated with one of each track recorded on a recording medium on which tracks as units of audio data are grouped and managed by management information and each group managed by the management information; and an image file updating step of registering image data specified to be associated with one of a certain track and a certain group in the image file together with correspondence specifying information indicating correspondence with one of the track and the group.

According to an embodiment of the present invention, there is provided a display control method including: an image file reading step of reading an image file from a recording medium on which tracks as units of audio data are grouped and managed by management information and the image file in which image data associated with one of each track and each group is collected is recorded, and storing the image file in buffer memory means; an image data extracting step of, when audio data from the recording medium is reproduced, extracting image data associated with one of a track to be reproduced and a group including the track from the image file stored in the buffer memory means; and a display output step of performing display output of the image data extracted in the image data extracting step.

That is, in an embodiment of the present invention, a device supporting a recording medium on which tracks as units of audio data are grouped and managed by management information generates an image file in which image data (for example thumbnail image data) associated with each track is collected or an image file in which image data (for example thumbnail image data) associated with each group is collected, and records the image file onto the recording medium.

When reproduction of audio data and display of an image corresponding to the track or group are to be performed simultaneously, or when image data is to be displayed for list display of tracks or groups, for example, the image data to be displayed is obtained from the image file. This image file is read and stored in a buffer memory in advance to eliminate a need for access to the recording medium in display.

According to an embodiment of the present invention, an image file in which image data corresponding to each track is collected, or an image file in which image data corresponding to each group is collected is generated, and recorded on a recording medium. The data of the image file is read from the recording medium in advance, so that list display of images for tracks and groups can be made with good response.

That is, since image data necessary in audio data reproduction is collected in the image file, the necessary image data can be input to buffer memory means efficiently (in order to prepare the image data for display, it suffices to read only the image file). In addition, when the image file is input to the buffer memory means, the necessary image data can be obtained without accessing the recording medium. Therefore, even a system using a disk recording medium can perform display output without waiting for a disk access time.

Thus, at a time of list display of tracks or groups, or at a time of displaying image data (a jacket picture or the like) corresponding to a track or a group during reproduction of the track, for example, quick display output of the image data can be realized without access to the disk recording medium.

Further, eliminating a need for accessing the disk recording medium for image data in displaying the image data decreases the frequency of sled movement at times of disk access and decreases an access driving time, so that reduction in power consumption can be realized. Eliminating a need for accessing the disk recording medium to obtain image data displayed simultaneously with reproduction of audio data, in particular, is more useful because efficiency can be improved with consideration given to only access for audio data.

BRIEF DESCRIPTION OF THE DRAWINGS

FIGS. 1A, 1B, 1C, 1D, 1E, and 1F are a front view, a plan view, a left side view, a right side view, a bottom view, and a rear view of an audio-camera composite device according to an embodiment of the present invention;

FIG. 3 is a block diagram of the audio-camera composite device according to the embodiment;

FIG. 5 is a diagram of assistance in explaining a structure for managing audio tracks according to the embodiment;

DETAILED DESCRIPTION OF THE PREFERRED EMBODIMENT

Figure 2A:
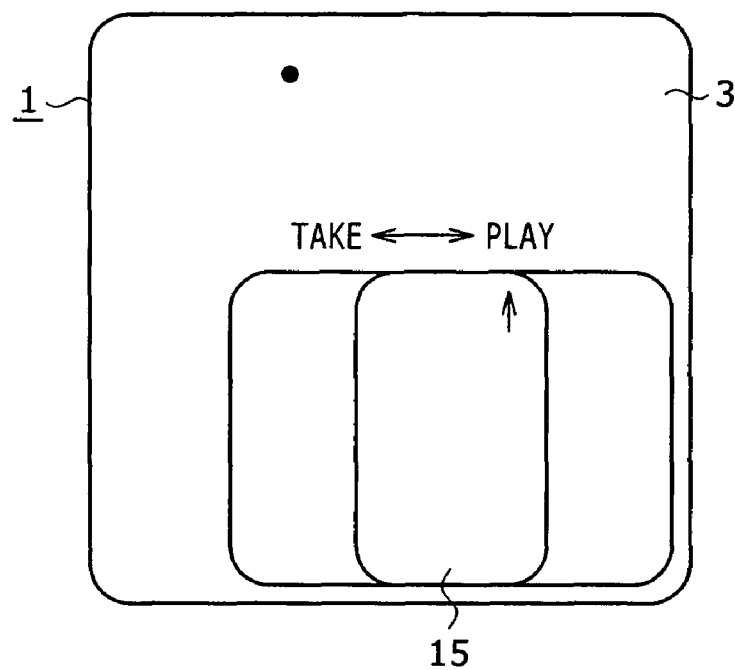
FIGS. 2A and 2B are diagrams of assistance in explaining an open state and a closed state of a lens cover in the embodiment.

A device having a composite function of a portable type audio player and a camera will hereinafter be described as an embodiment of the present invention. The audio-camera composite device in this example reproduces audio data using an optical disk as a recording medium, and can record picked-up still image data (picked-up image data) on the optical disk and reproduce the image data. Description will be made in the following order.

[1. External Configuration of Audio-Camera Composite Device]
[2. Internal Configuration of Audio-Camera Composite Device]
[3. File Management Form]
[4. Audio Data Management Form]
[5. Jacket Picture Registering Process]
[6. Jacket Picture Displaying Process]
[7. Effects and Modifications of the Embodiment]

[1. External Configuration of Audio-Camera Composite Device]

FIGS. 1A, 1B, 1C, 1D, 1E, and 1F are a front view, a plan view, a left side view, a right side view, a bottom view, and a rear view of the audio-camera composite device 1 in the present example.

The casing of this audio-camera composite device 1 is formed by an upper casing 2 and a lower casing 3. The upper casing 2 is opened and closed with respect to the lower casing 3. Though detailed description of a mechanism will be omitted, operating an opening and closing operating element 16 shown in FIG. 1E sets the upper casing 2 in an opened state and exposes a mechanism for loading a disk of a so-called minidisk system. After the upper casing 2 is closed in a state in which the disk is loaded, information on a disk is recorded or reproduced on the disk within the casing.

The audio-camera composite device 1 can reproduce audio data (musical pieces or the like) recorded on the disk loaded in the audio-camera composite device 1, and thus functions as a portable type audio player. In addition, the audio-camera composite device 1 can record and reproduce picked-up image data on the disk, and thus functions as a digital still camera.

Incidentally, in the following, a state of operation in which the audio-camera composite device 1 functions as an audio player will be referred to as an audio mode, and a state of operation in which the audio-camera composite device 1 functions as a digital still camera will be referred to as a camera mode.

As shown in FIG. 1A, a display unit 4 formed by a liquid crystal panel, for example, is provided on a front surface of the casing. The display unit 4 in the audio mode displays a list or an operation menu for selecting audio data recorded on the optical disk, the number of a track being reproduced, time information such as a progress time, a total play time and the like, an operation guide, an album jacket image or an image associated with a track, a slide show image, a thumbnail image, and the like.

The display unit 4 in the camera mode displays a subject image (actual moving image) being captured by an image pickup element in an image pickup standby state or a still image (picture image) picked up at a time of operating a shutter, and displays a reproduced image or a thumbnail image of a picture picked up in the past (picked-up image data recorded on the optical disk) in a picture viewing state.

Various operating elements are provided at predetermined positions on the casing.

As shown in FIG. 1A, a centralized controller 5, a menu key 6, a stop/cancel key 7, a slide show key 8, and a display key 9 are provided as operating elements on the front surface of the casing. As shown in FIG. 1B, a camera on/off key 10 and a shutter button 11 are provided on the top surface of the casing. As shown in FIG. 1D, a volume key 12, a download key 13, and a hold switch 14 are provided on a side surface of the casing.

The centralized controller 5 is an operating element for performing main operation in both the audio mode and the camera mode. The centralized controller 5 allows a push operation that presses a central part of the centralized controller 5. In addition, four corners around the center of the centralized controller 5 can each be pressed. The pressing of the upper corner, the lower corner, the left corner, and the right corner are an up operation, a down operation, a left operation, and a right operation. Further, a peripheral part of the centralized controller 5 is formed to be rotatable as a so-called jog dial, and allows a clockwise jog operation or a counterclockwise jog operation.

The push operation, the up operation, the down operation, the left operation, the right operation, and the jog operation are assigned predetermined functions depending on the mode state, and are for example assigned main operation functions performed by a user, such as reproduction, a pause, a stop, cursor movement on a menu or a list display, entering, mode change, track feed/reverse feed, fast forward/fast reverse, and the like.

The menu key 6 is a key for on/off operation of operation menu display on the display unit 4.

The stop/cancel key 7 is a key for stopping a reproduction operation and performing various canceling operations.

The slide show key 8 is a key for giving an instruction to display image data during audio reproduction, for example, as a slide show.

The display key 9 is a key for changing a display mode, display contents or the like on the display unit 4.

The camera on/off key 10 is a key for giving an instruction to start the camera mode and end the camera mode.

The shutter button 11 is a key for specifying timing of image pickup in the camera mode. A picture image is picked up by pressing the shutter button 11.

The volume key 12 is a key for adjusting sound volume in audio reproduction.

The download key 13 is a key for downloading data when the audio-camera composite device 1 is connected to a personal computer, for example.

The hold switch 14 is a slide operating element for disabling each operating element key (setting each operating element key in a hold state) to prevent erroneous operation while the audio-camera composite device 1 is carried, for example.

As shown in FIG. 1E, a USB terminal 3 is provided in a bottom surface of the casing to allow connection to a personal computer, for example, via a USB interface.

As shown in FIG. 1C, a headphone/remote control terminal 18 is formed in a side surface of the casing, and is connected with a headphone provided with a remote control.

As in FIG. 1D, a battery box opening and closing unit 19 is provided in a side surface of the casing. When the battery box opening and closing unit is opened, a battery can be inserted or extracted.

As shown in FIG. 1F, a lens cover 15 that allows slide operation thereof is provided on a rear side of the casing. The lens cover 15 is provided to protect an image pickup lens.

Figure 2B:
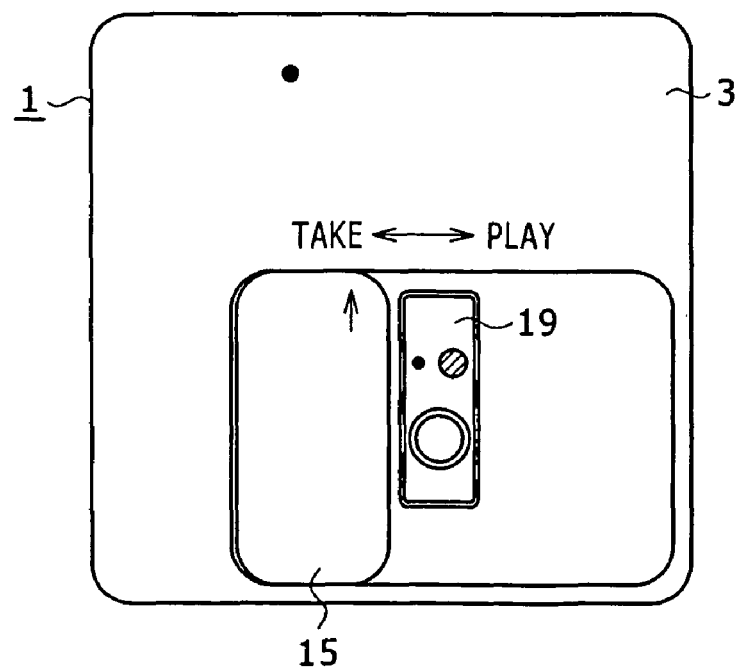

FIGS. 2A and 2B show an open state and a closed state obtained by sliding the lens cover 15.

The lens cover 15 can be slid into a closed state as shown in FIG. 2A and an open state as shown in FIG. 2B. Setting the lens cover 15 in the open state as shown in FIG. 2B exposes an image pickup lens unit 19, and thus enables camera image pickup. In the closed state as shown in FIG. 2A, the image pickup lens unit 19 is covered, and thus the lens is protected. The operation of sliding the lens cover 15 in this example is also an operation of giving an instruction for a transition of a state of operation.

[2. Internal Configuration of Audio-Camera Composite Device]

The internal configuration of the audio-camera composite device 1 will be described with reference to FIG. 3.

A CPU 30 functions as a unit for controlling the device as a whole. The CPU 30 performs for example control for reproduction operation in the audio mode, image pickup operation and image reproduction operation in the camera mode, display operation of the display unit 4, and the like, detection of a user operation, a process for a transition of a state of operation, and control of communication with an external device. The CPU 30 exchanges data and control information with each part via a bus 50.

A RAM 31 is used as an arithmetic work area by the CPU 30, and is used to store information during operation.

A ROM 32 stores a program to be executed by the CPU 30, various process coefficients, and the like.

A nonvolatile memory 33 (an NV-RAM or a flash ROM) is used to store various coefficients, setting information, a resuming point (an address at a time of a reproduction stop), and other information to be retained while power is off.

A medium drive unit 34 performs recording and reproduction on a disk 90, for example an optical disk (or a magneto-optical disk) of the minidisk system under control of the CPU 30. For this, the medium drive unit 34 includes for example an encoding unit for encoding data to be recorded onto the disk 90 into a recording format, a decoding unit for decoding reproduced data from the disk 90, a recording and reproducing head, a servomechanism, and a spindle motor mechanism.

A buffer memory 35 is formed by an SD-RAM, for example. The buffer memory 35 buffers data to be transferred to the medium drive unit 34 and recorded onto the disk 90, and buffers data read from the disk 90 by the medium drive unit 34.

The medium drive unit 34 reads management information recorded on the disk 90, that is, physical information, area information, recorded data file information and the like of the disk 90, which information is necessary to record and reproduce data, according to an instruction from the CPU 30 when the disk 90 is loaded (system read). These pieces of management information are stored in a partial area of the buffer memory 35 for reference by the CPU 30. Incidentally, the CPU 30 may transfer the management information stored in the buffer memory 35 to the RAM 31, and refer to the management information.

Further, in the present example, a track thumbnail file and a group thumbnail file to be described later are read from the disk 90 at the time of system read, and stored in a predetermined area of the buffer memory 35.

A memory interface 36 transfers data stored in the buffer memory 35, and controls a writing/reading address within the buffer memory.

A compression encoding/decoding unit 37 compression-encodes audio data and decodes compressed data by an ATRAC compression system, for example.

Audio data converted into linear PCM data, for example, by being decoded by the compression encoding/decoding unit 37 is converted into an analog audio signal by a D/A converter 47, and then supplied to a headphone amplifier 48. The headphone amplifier 48 performs an amplification process, an impedance adjusting process and the like, and then supplies an audio signal to a headphone terminal 49.

The headphone terminal 49 is a headphone terminal part of the headphone/remote control terminal 18 in FIG. 1C. The headphone provided with the remote control, the headphone being connected to the headphone terminal 49, outputs reproduced audio.

Incidentally, though not shown in the figure, when an input system of a line input, a microphone input, and a digital audio input, for example, is provided and an analog audio signal or digital audio data is input, the input audio signal is supplied to the compression encoding/decoding unit 37 in a digital audio data format to be compression-encoded. Then, the compression-encoded data is transferred to the medium drive unit 34 via the buffer memory 35, and recorded onto the disk 90, whereby an audio recording function is realized.

When for example the audio-camera composite device 1 is connected to a personal computer or the like, and audio data is downloaded to the audio-camera composite device 1, the data may be compression-encoded by the compression encoding/decoding unit 37.

A USB interface 39 performs a process for data transfer between the USB interface 39 and a device such as a personal computer or the like connected to the USB interface 39 via a USB terminal 17.

A serial interface 40 performs a data input and output process between the serial interface 40 and a camera/LCD block to be described later.

An A/D port 41 detects various user operations, and supplies an A/D converted value as operation information to the CPU 30. Operating keys 44 refer to the centralized controller 5, the menu key 6, the stop/cancel key 7, the slide show key 8, the display key 9, the camera on/off key 10, the shutter button 11, the volume key 12, and the download key 13 described above. The A/D port 41 sends information on operation of these operating elements as a predetermined value to the CPU 30.

A remote control terminal 46 is a remote control terminal part of the headphone/remote control terminal 18 in FIG. 1C. Operation information from the remote control provided to the connected headphone is detected by the A/D port 41, and is sent as a predetermined value to the CPU 30.

A serial interface 42 supplies display data specified by the CPU 30 from the remote control terminal 46 to the remote control. A display unit is formed in the remote control provided to the headphone. The display unit performs display operation based on display control information supplied from the CPU 30 via the serial interface 42.

A DSP interface 43 transfers data and control information between each part on the bus 50, such as the CPU 30, the USB interface 39 and the like, and the compression encoding/decoding unit 37.

An operation of the hold key 14 is detected by the CPU 30. When a key disabling operation is performed by the hold key 14, the CPU 30 treats information on operation of the operating keys 44 which information is supplied via the A/D port 41 as ineffective information.

A cover-interlocked switch 45 is turned on or off in response to opening or closing of the lens cover 15, and functions as a unit for detecting the opening or closing of the lens cover 15. The CPU 30 knows whether the lens cover 15 is in an open state or in a closed state by detecting the on/off state of the cover-interlocked switch 45.

A camera/LCD block 38 is a part as an image pickup processing system and a display processing system including the display unit 4.

The image pickup processing system includes for example a solid-state image pickup element unit such as a CCD sensor, a CMOS sensor or the like that detects subject light entered by the above-described image pickup lens unit 19, an image pickup signal transfer circuit for transferring a pixel signal from a solid-state image pickup element, and performing gain adjustment and A/D conversion, a digital processing system for subjecting picked-up image data obtained by the image pickup signal transfer circuit to a white balance process, a Y/C process and the like, and an encoding system for subjecting the picked-up image data to a compression process, a format process and the like.

The display processing system includes for example a display image processing unit for forming an image, text, characters or the like to be displayed on an LCD as the display unit 4, and a display driving circuit for driving the LCD on the basis of a display image.

The audio-camera composite device reproduces audio data recorded on the disk 90 in the audio mode.

When a user performs a reproduction operation using an operating key 44 or the remote control, the CPU 30 controls the medium drive unit 34 to reproduce an audio file (audio track) on the disk 90.

The audio data reproduced by the medium drive unit 34 is stored in the buffer memory 35, and thereafter read sequentially, transferred to the compression encoding/decoding unit 37, and decoded. The D/A converter 47 then converts the audio data into an analog audio signal. The analog audio signal is output as audio from the connected headphone after being processed by the headphone amplifier 48.

In this audio mode, the display unit 4 and the display processing system in the camera/LCD block 38 displays a reproduction menu (display of a list of the names of musical pieces or the like), the name of a musical piece being reproduced, an artist name, time information, a jacket image, a slide show image or the like under control of the CPU 30.

In an image pickup standby state in the camera mode, the CPU 30 controls the camera/LCD block 38 to capture a subject image, process an image signal, and display the subject image (actual moving image) on the display unit 4.

When the user presses the shutter button 11 in that state, the CPU 30 performs control to record a subject image (still image) at that point in time as picked-up image data. Specifically, the CPU 30 supplies image data of one frame at the time of the shutter operation as data to be recorded to the medium drive unit 34 via the buffer memory 35.

The medium drive unit 34 records the image pickup data as one picture image file on the disk 90.

In a picture viewing state in the camera mode, the CPU 30 makes the medium drive unit 34 read picture image file data recorded on the disk 90. The read image data is transferred to the camera/LCD block 38 via the buffer memory 35 to be displayed on the display unit 4.

Incidentally, there is a case where images of picture image data are displayed on the display unit 4 one at a time, and there is a case where a large number of images are displayed as thumbnail images in a list. The CPU 30 performs control so as to switch between one-image display and thumbnail display in response to an operation by the user.

[3. File Management Form]

A form of management of image pickup data and audio data recorded on the disk 90 will be described in the following.

Data recorded on the disk 90 is managed by a FAT file system, for example.

Figure 4:
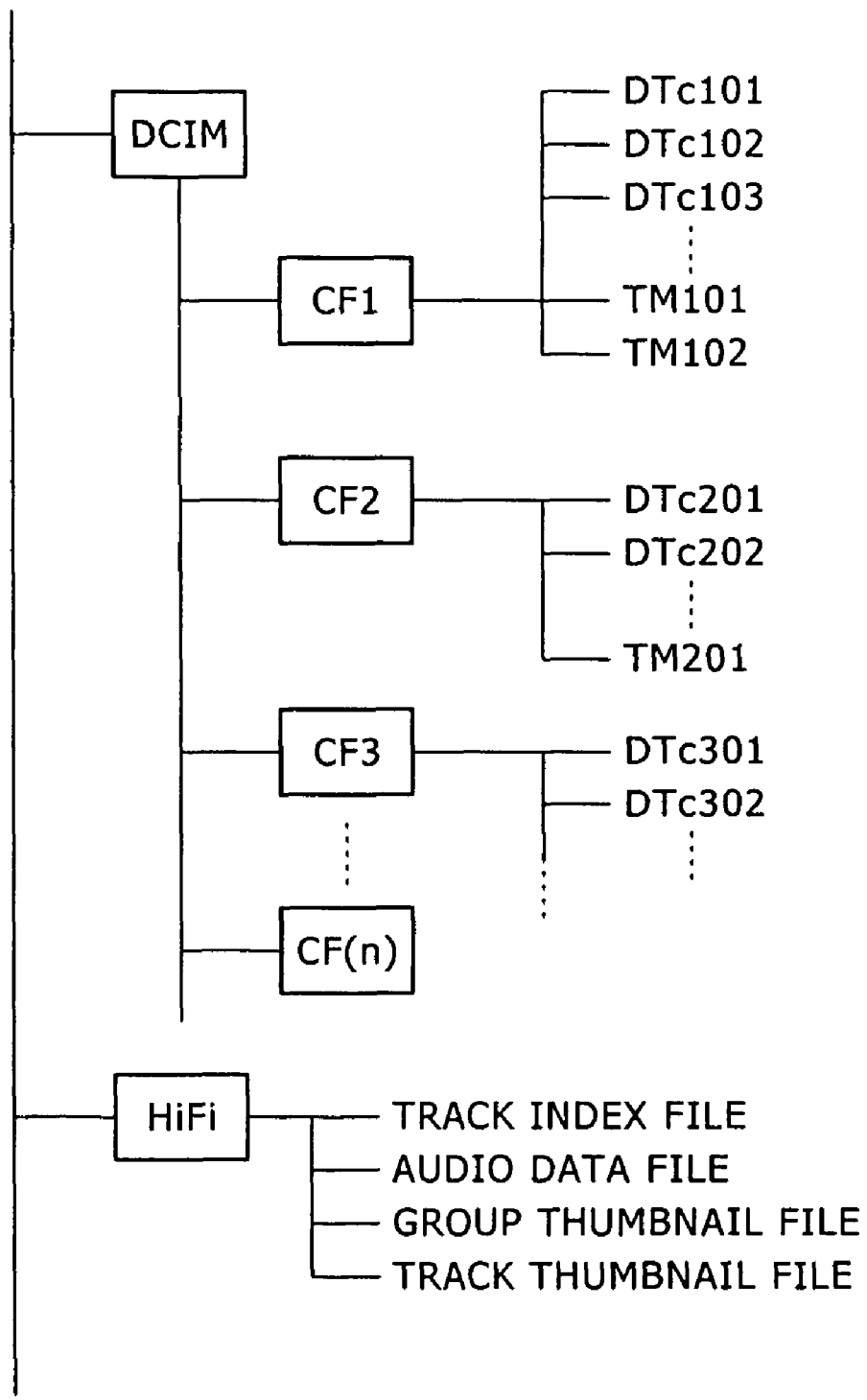
FIG. 4 is a diagram of assistance in explaining a form of file management according to the embodiment.

As shown in FIG. 4, a DCIM directory and a HiFi directory are disposed in a root of the FAT file system.

Still images (image pickup data and the like) in a digital camera system are managed in compliance with a JEIDA camera file system standard (Design rule for Camera File system: a DCF standard). The DCF standard provides that a DCIM directory be placed in a root.

A maximum of 999 image data folders CF1, CF2, . . . can be placed in the DCIM directory.

While it is specified that a maximum of 9999 pieces of still image data can be stored in each image data folder CF, the maximum number may be set arbitrarily for convenience of design (it suffices for the maximum number to be 9999 or less).

FIG. 4 shows image data files included in the image data folder CF1 as DTc101, DTc102 . . . .

Each of the files DTc101 . . . includes header information and thumbnail data as well as actual image data. Further, one or a plurality of thumbnail files in which the thumbnail data of the files is collected are generated, and disposed within the image data folder CF1. Files TM101 and TM102 represent thumbnail files. One thumbnail file is set to store a maximum of 100 thumbnail images, for example.

The other image data folders CF2, CF3 . . . have a similar structure.

The HiFi directory manages audio data of the minidisk system. A track index file and an audio data file are disposed in the HiFi directory. Further, in this example, a group thumbnail file and a track thumbnail file are disposed within the HiFi directory.

The audio data file includes tracks as actual audio data, various fringe information and the like. These pieces of actual data are managed by management information within the track index file.

While a structure of management by the track index file will be described later, a large number of tracks as audio data are managed in one or a plurality of divided groups. A group is a division for each album, each artist, or a user setting, for example.

The group thumbnail file is a file in which thumbnail image data associated with each group is collected.

The track thumbnail file is a file in which thumbnail image data associated with each track is collected.

[4. Audio Data Management Form]

A form of management of audio data managed by the track index file within the HiFi directory will be described with reference to FIG. 5.

The track index file and the audio data file are basically disposed in the HiFi directory, as described above. The track thumbnail file and the group thumbnail file are disposed in the HiFi directory as characteristic files of the present embodiment.

The audio data file is formed by storing a plurality of pieces of musical data in one file. When viewed in the FAT system, the audio data file appears to be a file of great size. The contents of the audio data file are divided into parts, and audio data is handled as a set of parts.

Basically, tracks as actual audio data and various fringe information (additional information) are recorded in the audio data file. The data of the audio data file is managed by the track index file as management information.

That is, the track index file is a file in which various information for managing musical data and the like stored in the audio data file are described.

As shown in FIG. 5, the track index file includes a play order table, a track information table, a name table, a group information table, and a parts information table. Incidentally, though not shown in the figure, a programmed play order table is also provided in the track index file.

The play order table indicates the order of reproduction of tracks defined by default. The play order table manages for example a maximum of 2047 track numbers TNO1 to TNO2047. That is, the play order table manages the order of reproduction of a maximum of 2047 tracks. In each track number TNO, link information on a link to the track information table is described.

Though not shown in the figure, the programmed play order table in which the order of reproduction is defined by the user is provided separately from the play order table.

In the group information table, information on groups is described.

A group is a set of one or more tracks having consecutive numbers, or a set of one or more tracks having consecutive programmed track numbers. Group management is utilized when a large amount of musical pieces recorded on the disk are desired to be divided into album units, for example. A maximum of 255 groups can be registered.

In the group information table, group descriptors (GPD0, GPD1, GPD2 . . . ) of respective groups are described. In the group descriptor GPD, a track number at which the group starts and an end track number are described as "From" and "to." In addition, a group type, link information such as fringe data corresponding to the group, and the like are described.

In the example of FIG. 5, when tracks TNO2, TNO3, and TNO4 in the play order table form one group, information on this group is managed by the group descriptor GPD0 in the group information table. In this case, "From" and "to" in the group descriptor GPD0 indicate the tracks TNO2 and TNO4, respectively.

In the track information table, information on each track (each musical piece) is described. The track information table includes track descriptors (TKD0, TKD1 . . . ) associated with respective tracks. Described in each track descriptor TKD are for example an encoding system, copyright management information, content decryption key information, pointer information on a pointer to a part number as an entry where the musical piece starts, an artist name, a title name, original musical piece order information, and recording time information. The artist name and the title name are not a name itself, and pointer information on a pointer to the name table is described as the artist name and the title name. The encoding system represents a codec system, and serves as decoding information.

The name table shows characters as name entities. The name table includes a plurality of name slots (NS0, NS1 . . . ) Each name slot NS is linked and called from pointers indicating names. Pointers for calling names include for example artist names and track names in the track information table, album names, and group names in the group information table. Each name slot NS can be called from a plurality of pointers.

Each name slot NS has name data as character information, a name type as an attribute of the character information, and a link. A long name not contained in one name slot can be described by dividing the name into a plurality of name slots. When a name is not contained in one name slot, a link to a name slot in which a subsequent part of the name is described is described.

In the parts information table, pointers for accessing the actual positions of musical pieces from part numbers are described. A part refers to all of one track (musical piece) or each part resulting from dividing one track.

The parts information table includes part descriptors (PTD0, PTD1 . . . ) for respective parts. The entry of the part descriptor PTD is pointed to by the track descriptor TKD in the track information table or the group descriptor GPD in the group information table.

Pointers "From" and "to" of each part descriptor PTD indicate a start address of the part and an end address of the part in the audio data file. "Link" indicates a part descriptor managing a part following that part.

Incidentally, for an address used as part number pointer information, name table pointer information, and pointer information indicating a position of the audio file, a byte offset in the file, a FAT cluster number, a physical address of the disk used as recording medium, and the like can be used.

In a system for managing audio data in this example, necessary information is read with the play order table in the track index file (TIF) as a starting point.

Taking the track TNO2 in the play order table as an example, a track descriptor (TKD1 in the case of FIG. 5) in the track information table to which descriptor the track TNO2 is linked is read. From the track descriptor TKD1, an encoding system, copyright management information, content decryption key information, pointer information on a pointer to a part number where the musical piece starts, pointers of an artist name and a title name, original musical piece order information, recording time information and the like are read.

The part number information read from the track descriptor TKD1 in the track information table is linked to a part descriptor (PTD0 in the case of FIG. 5) in the parts information table. Then, access is made from the linked part descriptor PTD0 in the parts information table to audio data from a start position to an end position (From/to) of the track.

When data at a position specified by the parts information table in the audio data file is accessed, audio data reproduction is started at the position. At this time, decoding is performed on the basis of the encoding system read from the track descriptor TKD1 in the track information table. When the audio data is encrypted, key information read from the track descriptor TKD1 is used.

Though not shown in the figure, when the track TNO2 is formed by a plurality of parts, for example, a part descriptor PTDx to which the part descriptor PTD0 managing a first part is linked is described in the part descriptor PTD0. The part descriptors are sequentially read according to the link. Then, a part position (From/to) in the audio data file which position is indicated by the part descriptor PTDx is accessed.

In addition, a name slot (NS2 in the case of FIG. 5) in the name table which slot is at a position indicated by the pointers of the artist name and the title name read from the track descriptor TKD1 in the track information table is called. The name data of the track TNO2 is read from the name slot NS2.

Information on groups is managed by the group information table. As described above, when the tracks TNO2, TNO3, and TNO4 are managed as one group by the group descriptor GPD0, an image (for example a jacket picture), text data and the like can be recorded in the audio data file as fringe information corresponding to the group.

In this case, a part descriptor (PTD1 in the case of FIG. 5) is indicated by a fringe information pointer (GP Fringe) in the group descriptor GPD0.

The part descriptor PTD1 describes part positions (From/to) of the fringe information, and thus indicates addresses within the audio data file. That is, actual image data as jacket image of the album, for example, text data and the like are recorded at the part positions indicated by "From" and "to."

Further, in this example, the group thumbnail file and the track thumbnail file can be placed in the HiFi directory.

As shown in FIG. 5, the group thumbnail file has 255 image slots (ISG1 to ISG255) so as to correspond to a maximum of 255 groups.

The track thumbnail file has 2047 image slots (IST1 to IST2047) so as to correspond to a maximum of 2047 musical pieces that can be recorded on the disk 90.

Figure 6A:
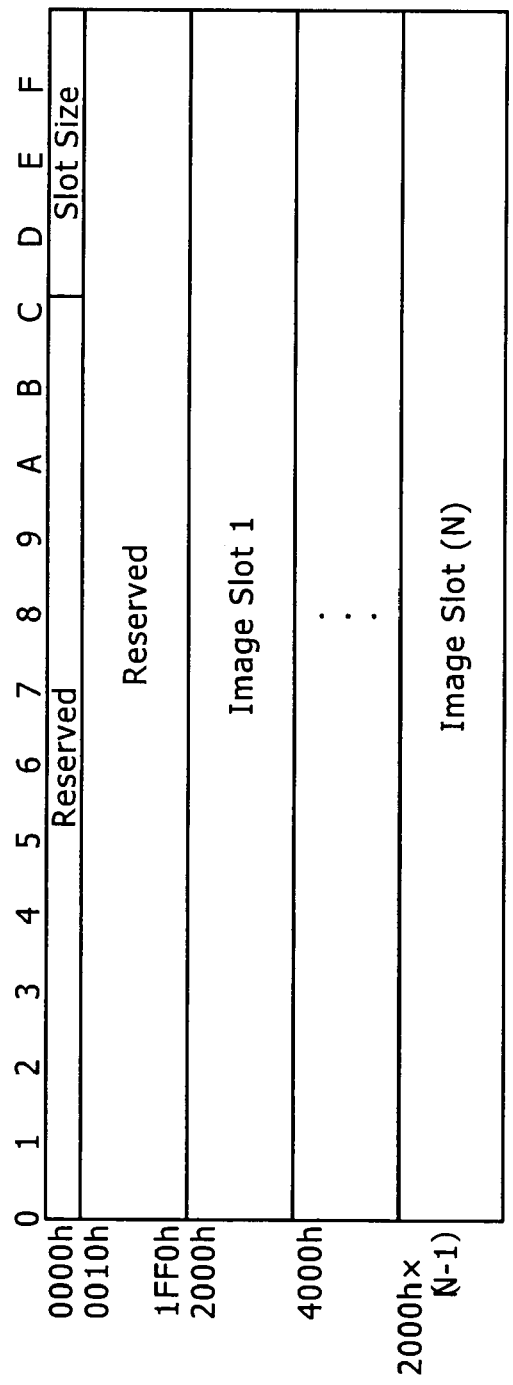
FIGS. 6A and 6B are diagrams of assistance in explaining the structure of a thumbnail file according to the embodiment.
Figure 6B:
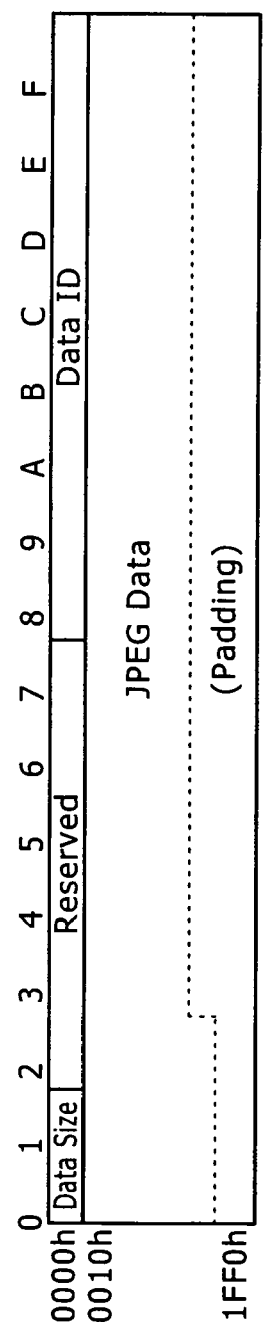

The structures of the group thumbnail file and the track thumbnail file are as shown in FIGS. 6A and 6B.

At a start of the files, a reserved (undefined) area and an area indicating slot size are provided as shown in FIG. 6A. A subsequent area as image slots (ISG1 to ISG255 or IST1 to IST2047) is formed. One image slot is 8192 bytes, for example.

The structure of each image slot is shown in FIG. 6B.

A data size, a data ID, and image data (JPEG data) are recorded in the image slot.

The data size indicates the size of the JPEG data. In an image slot in which valid JPEG data is not recorded, the value of the data size is "0."

The data ID is correspondence specifying information. A value identifying a group or a track with which the JPEG data in the image slot is associated is described as the data ID.

While the data ID may be the number of the corresponding track or the number of the corresponding group, the data ID is preferably the number of a part descriptor in the parts information table in order to deal properly with edits such as track deletion, track movement and the like.

For example, FIG. 5 shows that the data ID of an image slot (IST2 in the case of FIG. 5) in which JPEG data corresponding to the track TNO2 is recorded in the track thumbnail file indicates the part descriptor PTD0. As described above, the part descriptor PTD0 in the example of FIG. 5 manages the first part of the track TNO2. The image slot IST2 in the track thumbnail file is associated with the track TNO2 by indicating the part descriptor PTD0 by the data ID.

FIG. 5 also shows that the data ID of an image slot (ISG1 in the case of FIG. 5) in which JPEG data corresponding to the group of the tracks TNO2 to TNO4 is recorded in the group thumbnail file indicates the part descriptor PTD1. As described above, the part descriptor PTD1 in the example of FIG. 5 manages the fringe data of the group of the tracks TNO2 to TNO4 (the group managed by the group descriptor GPD0). The image slot ISG1 in the group thumbnail file is associated with the group of the group descriptor GPD0 by indicating the part descriptor PTD1 by the data ID.

Image data corresponding to a track or a group is recorded as JPEG data, for example, in the image slot IST or ISG. That is, the track thumbnail file is a file in which image data corresponding to tracks as audio data recorded on the disk 90 is collected. The group thumbnail file is a file in which image data corresponding to groups is collected.

For example, the image data associated with tracks and groups may be image data downloaded from a personal computer or a network via the USB interface or the like, or may be image pickup data obtained by image pickup by the user using a camera function.

When the user requests image data to be associated with a group or a track, the image data is associated with the group or the track, and registered in the group thumbnail file or the track thumbnail file.

[5. Jacket Picture Registering Process]

The CPU 30 forms the group thumbnail file and the track thumbnail file on the disk 90, and registers specific image data in an image slot in the group thumbnail file or the track thumbnail file in response to a jacket picture registering request.

Figure 7:
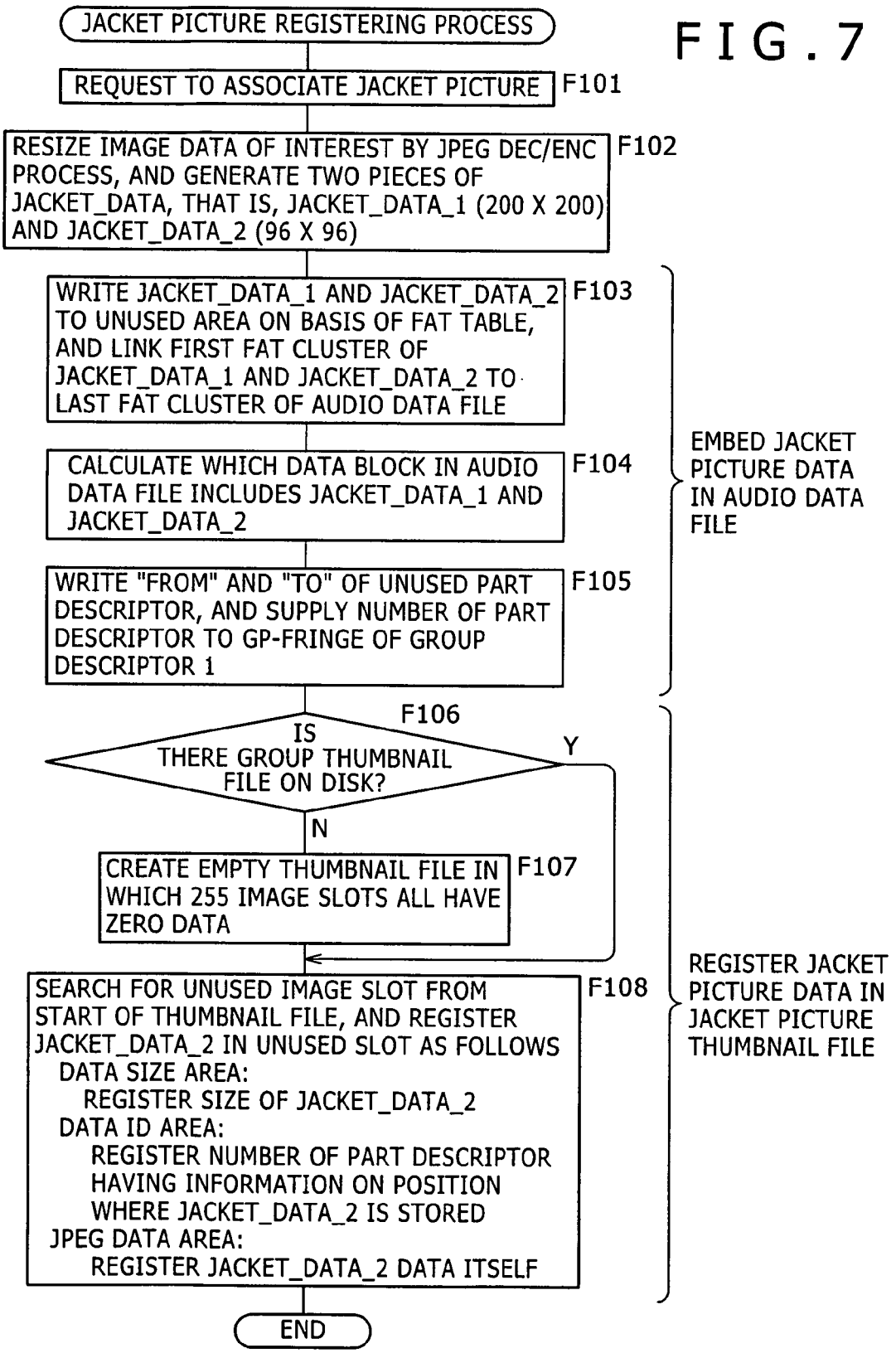
FIG. 7 is a flowchart of a jacket picture registering process according to the embodiment.

A process of registering image data as a jacket picture image in the group thumbnail file will be described in the following with reference to FIG. 7.

For example, suppose that a request to associate image data as a jacket picture of a group is generated by an operation by the user in step F101. The image data specified to be associated is for example image data obtained by image pickup by the user, image data captured from an external device via the USB interface 39, or image data stored in the DCIM directory, for example.

In this case, the CPU 30 in step F102 reads the specified image data of interest from the disk 90, and makes the image data of interest resized by a JPEG decoding/encoding process in the compression encoding/decoding unit 37. JACKET DATA 1 of 200×200 pixels and JACKET DATA 2 of 96×96 pixels, for example, are thereby generated.

In next step F103, the CPU 30 refers to a FAT table, and controls the medium drive unit 34 to write the JACKET DATA 1 and the JACKET DATA 2 in an unused area on the disk 90. The CPU 30 links a first cluster in which a first part of the JACKET DATA 1 and the JACKET DATA 2 is written to a last FAT cluster in the audio data file. That is, this process records jacket images (the JACKET DATA 1 and the JACKET DATA 2) as new fringe data of a certain group at an end of the audio data file.

In next step F104, the CPU 30 calculates which data block in the audio data file includes the jacket images (the JACKET DATA 1 and the JACKET DATA 2). The position of clusters of the jacket images (the JACKET DATA 1 and the JACKET DATA 2) written on the disk 90 from a start of the audio data file and the number of clusters as size of the jacket images (the JACKET DATA 1 and the JACKET DATA 2) can be determined by tracing the FAT. The CPU 30 thereby calculates the data block as a position where the jacket images are arranged.

In step F105, information on the jacket images (the JACKET DATA 1 and the JACKET DATA 2) is written to an unused part descriptor PTD (x) in the parts information table. That is, "From" and "to" in the part descriptor PTD (x) indicate the position of the jacket images (the JACKET DATA 1 and the JACKET DATA 2) recorded in the audio data file. Also, the number of the part descriptor PTD (x) is given to "GP Fringe" in the group descriptor GPD.

Thereby, as described with reference to FIG. 5, a certain part descriptor is specified by a certain group, and the recorded position of the jacket images (the JACKET DATA 1 and the JACKET DATA 2) as fringe data is managed by the part descriptor.

The process up to this step writes jacket images corresponding to a certain group in the audio data file, and constructs a management structure for the jacket images. A process for the group thumbnail file is performed after subsequent step F106.

In step F106, the CPU 30 determines whether the group thumbnail file is already present on the disk 90.

When the group thumbnail file is already formed on the disk 90, the process proceeds directly to step F108. When the group thumbnail file is not formed on the disk 90, a process of generating the group thumbnail file on the disk 90 is performed in step F107.

That is, an empty group thumbnail file in which all of 255 image slots ISG1 to ISG255 have zero data is created.

In step F108, a process of registering thumbnail image data, that is, the JACKET DATA 2 in the group thumbnail file is performed.

First, a search is made for an unused image slot from a start of the group thumbnail file. Then the thumbnail image data JACKET DATA 2 is registered in the unused image slot ISG (x) as follows.

First, the size of the JACKET DATA 2 is registered in a data size area of the image slot ISG (x). The number of the part descriptor is registered in a data ID. That is, the number of the part descriptor used in step F105 is registered in the data ID.

Then, the thumbnail image data JACKET DATA 2 is recorded in a JPEG data area of the image slot ISG (x).

As a result of the above process, jacket image data corresponding to a certain group is recorded as fringe information in the audio data file, and the jacket image data is also registered in the group thumbnail file.

Jacket images are thus registered in the group thumbnail file for each group managed by the group information table, so that the group thumbnail file has thumbnail image data of a corresponding group in each image slot ISG.

Incidentally, while the registering process for the group thumbnail file has been described above, as for image data corresponding to a track, it suffices to perform similar processes to those of steps F101 and F102 and steps F106 to F108 for the track thumbnail file.

Specifically, it suffices to generate JACKET DATA of 96×96 pixels, for example, by resizing the image corresponding to the track in step F102, and register the JACKET DATA in an image slot IST in the track thumbnail file by the similar process to that of steps F106 to F108. Incidentally, it is needless to say that when the track thumbnail file is created in step F107, a file provided with 2047 image slot areas is generated.

When the image data corresponding to the track is also recorded in the audio data file, it suffices to perform a similar process to that of steps F103 to F105 for the track.

[6. Jacket Picture Displaying Process]

The group thumbnail file and the track thumbnail file generated as described above are used at a time of audio reproduction or the like.

When the disk 90 is loaded, or when device power is turned on, the CPU 30 reads the FAT and the track index file from the disk 90 as system read, and loads the FAT and the track index file into the buffer memory 35. At this time, the CPU 30 also reads the group thumbnail file and the track thumbnail file, and stores the group thumbnail file and the track thumbnail file in a predetermined area of the buffer memory 35.

When a request to display a list of tracks or groups is made, or when a track is reproduced, for example, the CPU 30 performs control to read thumbnail image data from the group thumbnail file or the track thumbnail file stored in the buffer memory 35, and display the thumbnail image data on the display unit 4.

Incidentally, the image data registered in the group thumbnail file and the track thumbnail file is JPEG data of 96×96 pixels, for example, as described above. By collecting image data of the relatively small size, it is possible to avoid a load on the buffer memory 35 in terms of memory capacity in storing the group thumbnail file and the track thumbnail file in the buffer memory 35.

Figure 8:
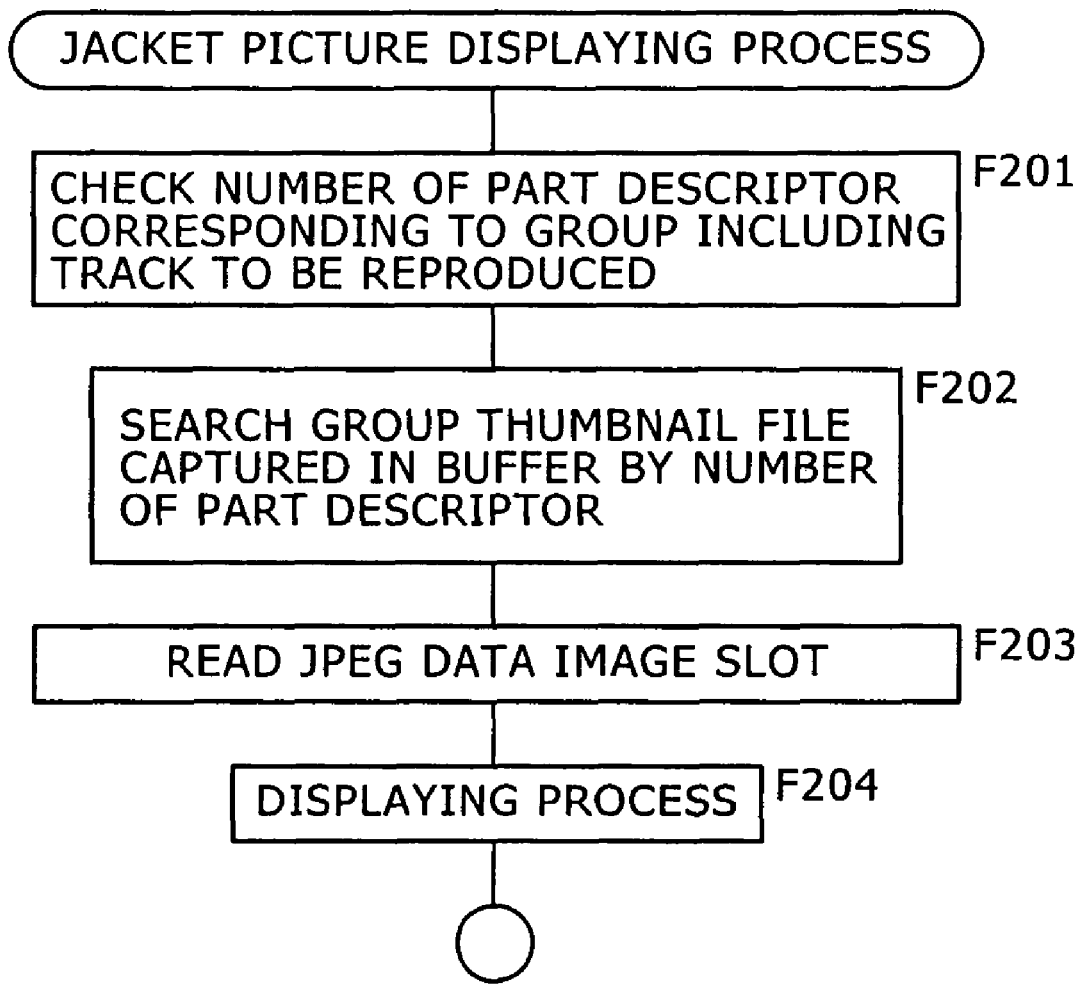
FIG. 8 is a flowchart of a jacket picture displaying process according to the embodiment.

FIG. 8 represents a process of the CPU 30 for displaying image data associated with a group including a track when the track in the group is reproduced.

When the user specifies a group or a track and performs a reproduction operation, the CPU 30 performs an audio reproduction operation, and as for a display process, the CPU 30 checks the number of a part descriptor corresponding to the group specified to be reproduced (or a group including the track specified to be reproduced) in first step F201. That is, the CPU 30 checks the number of the part descriptor indicated in "GP Fringe" in the group descriptor GPD (x) of the group in the group information table.

In next step F202, the CPU 30 searches the group thumbnail file loaded in the buffer memory 35 by the number of the part descriptor. That is, the CPU 30 retrieves an image slot ISG (x) in which the number of the part descriptor is described as data ID.

In next step F203, the CPU 30 reads JPEG data from the retrieved image slot ISG (x). This JPEG data represents a jacket picture of the group being reproduced now. This JPEG data is displayed on the display unit 4 in step F204.

As a result of the above process, the jacket image of the group including the track being reproduced is displayed on the display unit 4 during the audio reproduction.

It is not necessary to read the image data from the disk 90 for the displaying process, that is, disk access for the displayed image data is not necessary during the audio reproduction.

Hence, additional access to the disk 90 during intervals between audio data reading operations (involving sled movement) is not necessary for reading the image data, and quiescent periods between disk reading operations are not reduced. The present invention is therefore effective in reducing power consumption.

In addition, extracting the image data from the buffer memory 35 means that a time for accessing the disk 90 is not needed, so that quick image display can be realized.

While FIG. 8 represents the process for displaying an image corresponding to a group from the group thumbnail file, a process for displaying image data corresponding to a track during reproduction of the track can be similarly realized using the track thumbnail file stored in the buffer memory 35.

Specifically, the number of a part descriptor of the track to be reproduced is checked. On the basis of the number of the part descriptor, a corresponding image slot IST (x) in the track thumbnail file stored in the buffer memory 35 is retrieved. Then, JPEG data is extracted from the image slot IST (x), and displayed on the display unit 4.

When display of a list of groups is requested, it suffices to read JPEG data from image slots ISG in the group thumbnail file stored in the buffer memory 35, perform a reduction process, and display a list of pieces of image data. Similarly, when display of a list of tracks is requested, it suffices to read JPEG data from image slots IST in the track thumbnail file stored in the buffer memory 35, perform a reduction process, and display a list of pieces of image data. Also in displaying these lists, the group thumbnail file and the track thumbnail file stored in the buffer memory 35 are used to eliminate the need for accessing the disk 90 for list display, thus providing effects of quick-response display and reduction in power consumption.

Incidentally, when a track is deleted, the data IDs of all the image slots IST in the track thumbnail file are checked to identify an image slot IST associated with the number of the deleted track. That is, the image slot IST having the number of a part descriptor corresponding to the deleted track as data ID is identified. Then, data size information in the image slot IST is set to "0."

When a track movement edit (a track number change) is performed, only associations of track numbers with data IDs that can identify actual audio data (that is, the numbers of part descriptors) are changed, and no thumbnail file edit is required.

[7. Effects and Modifications of the Embodiment]

According to the embodiment as described above, image data used to display jacket pictures of groups or tracks is thumbnail data, and the thumbnail data is collected in one file (the group thumbnail file or the track thumbnail file).

At a time of a start or at a time of loading a disk, the thumbnail files are read in system read, and jacket pictures are stored in the buffer memory 35. At a time of music reproduction or list display, image data to be displayed is extracted from the thumbnail file in the buffer memory 35.

Thereby quick-response display can be realized at a time of display of a jacket picture during music reproduction, list display or the like. In addition, the frequency of disk access and sled movement for jacket picture display and the like is reduced, which leads to reduction in power consumption.

Further, having the group thumbnail file and the track thumbnail file separately from each other facilitates management of the group thumbnail file and the track thumbnail file.

It is to be noted that while the track thumbnail file and the group thumbnail file are formed in the foregoing example, the present invention also includes generating only one of these files and using the file for image display.

While the embodiment is an example of an audio-camera composite device, the present invention is applicable to an audio recording and reproducing device without a camera function.

While in the embodiment, the disk 90 of the minidisk system is taken as an example of a recording medium for recording audio data and image data, the present invention is suitable for cases where optical disks conforming to other standards such as a CD (Compact Disc) system, a DVD (Digital Versatile Disc) system, a Blu-Ray Disc system, and the like are used as recording medium. Of course, various recording media such as HDDs (Hard Disk Drives) and other magnetic disk media, magnetic tape media and the like can be used as a recording medium for the device according to the present invention. The present invention is particularly effective in a system using a recording medium that requires time for access thereto.

It should be understood by those skilled in the art that various modifications, combinations, sub-combinations and alterations may occur depending on design requirements and other factors insofar as they are within the scope of the appended claims or the equivalents thereof.

What is claimed is:

1. A recording device comprising:
   recording means for recording data onto a recording medium, wherein the data includes:
      audio data comprising:
         at least one music piece that is grouped into at least one group and is managed by management information, and
         fringe information about the at least one group, wherein the fringe information comprises at least one group thumbnail image associated with the at least one group, and
      image data comprising first image data associated with the at least one music piece and second image data associated with the at least one group; and
   controlling means for generating a track index file, a track thumbnail file comprising at least one first thumbnail image of the first image data associated with the at least one music piece recorded on said recording medium and a group thumbnail file comprising the at least one group thumbnail image of the second image data, and for controlling recording of said image data onto said recording medium by said recording means,
   wherein the track index file comprises:
      at least one first identifier identifying a start address and an end address within the audio data of at least one part of the at least one music piece associated with the first thumbnail image and a first link indicating at least one other identifier identifying at least one other part of the at least one music piece, and
      at least one second identifier identifying a start address and an end address within the audio data of at least one part of the fringe information about the at least one group and a second link indicating at least one other identifier identifying at least one other part of the fringe information.

2. The recording device as claimed in claim 1, wherein said controlling means resizes the image data recorded on said recording medium, and includes and records the resized image data as image data associated with one of a certain track and a certain group in said image file.

3. The recording device as claimed in claim 1, wherein said controlling means includes correspondence specifying information indicating correspondence to one of a certain track and a certain group in each piece of the image data included in the track thumbnail file or the group thumbnail file, and records each piece of the image data including the correspondence specifying information in the track thumbnail file or the group thumbnail file.

4. A reproducing device comprising:
   reproducing means for reproducing data from an optical disk recording medium having stored thereon:
      an audio data file comprising audio data and fringe information, wherein at least one music track as a unit of the audio data is grouped into at least one group and managed by management information included in a track index file;
      an image file comprising:
         a first thumbnail image of a first image associated with the at least one music track, and
         a second thumbnail image of a second image associated with the at least one group managed by said management information; and
      a track index file comprising:
         at least one first identifier identifying a start address and an end address within the audio data file of at least one part of the at least one music track associated with the first thumbnail image, and
         at least one second identifier identifying a start address and an end address within the audio data file of at least one part of the fringe information about the at least one group, wherein the fringe information comprises the at least one second thumbnail image;
   buffer memory for, in response to loading the optical disk recording medium into the reproducing device, buffering in advance, at a first time, the image file and the track index file stored on said optical disk recording medium;
   displaying means; and
   controlling means for:
      reading said image file and the track index file from said optical disk recording medium by said reproducing means and controlling buffering of said image file and the track index file in said buffer memory at the first time, and
      in response to reading the audio data file directly from said optical disk recording medium, at a second time that is different from the first time,
         reading the track index file from the buffer memory to:
            access the at least one part of the at least one music track within the audio data file using the at least one first identifier, and
            access the at least one part of the fringe information within the audio data file using the at least one second identifier, and
         reading the image file to extract the first thumbnail image and the second thumbnail image stored in said buffer memory means and causing said displaying means display at least one of the first thumbnail image and second thumbnail image.

5. The reproducing device as claimed in claim 4, wherein:
   the first thumbnail image includes correspondence specifying information indicating correspondence to the at least one music track;
   and the second thumbnail image includes correspondence specifying information indicating correspondence to the at least one group; and
   the controlling means uses the correspondence specifying information, wherein said controlling means extracts the first thumbnail image associated with the at least one music track to be reproduced and the second thumbnail image associated with the at least one group including the at least one music track to be reproduced from the at least one thumbnail file.

6. A method of generating an image file comprising a first image file and a second image file, the method comprising steps of:
generating the first image file in which image data is registered, said image data comprising at least one first thumbnail image of a first image being associated with at least one music track from a plurality of music tracks recorded on a recording medium as units of audio data;
generating the second image file comprising at least one second thumbnail image of a second image being associated with at least one group including the at least one music track, wherein:
the plurality of tracks are grouped into the at least one group and managed by management information,
the first image file includes at least one first identifier identifying a start address and an end address in the audio data of at least one part of the at least one music track associated with the at least one first thumbnail image and a first link indicating at least one other identifier identifying at least one other part of the at least one music track, and
the second image file includes at least one second identifier identifying a start address and an end address in the audio data of at least one part of fringe information about the at least one group associated with the at least one second thumbnail image and a second link indicating at least one other identifier identifying at least one other part of the fringe information, wherein the fringe information comprises the at least one second thumbnail image; and
updating the image file by registering, in the first image file, a new first thumbnail image to be associated with a music track of the plurality of tracks and by registering, in the second image file, a new second thumbnail image to be associated with a group from the at least one group in said image file, wherein the new first thumbnail image comprises correspondence specifying information indicating correspondence of the new first thumbnail image to the music track and the new second thumbnail image comprises correspondence specifying information indicating correspondence of the new second thumbnail image to the group.

7. A display control method comprising steps of:
in response to loading an optical recording medium into a reproducing device, recording in advance, at a first time, an image file and a track index file stored on the optical recording medium into a buffer memory, wherein:
the optical recording medium stores the image file, the track index file, and an audio data file comprising audio data and fringe information,
a plurality of tracks as units of the audio data are grouped into at least one group and managed by management information,
said image file comprises a track thumbnail file comprising a first image associated with at least one track of the plurality of tracks and a group thumbnail file comprising a second image associated with the at least one group, and
the track index file comprises:
at least one first identifier identifying a start address and an end address within the audio data file of at least one part of the at least one track associated with the track thumbnail image, and
at least one second identifier identifying a start address and an end address within the audio data file of at least one part of the fringe information about the at least one group, wherein the fringe information comprises the at least one group thumbnail image;
extracting the track index file, the first image and the second image from the buffer memory in response to reading and reproducing, at a second time that is different from the first time, the audio data directly from the optical recording medium; and
performing display output of at least one of the extracted first image and the extracted second image.

8. A recording device comprising:
a recorder for recording an auto data file comprising audio data onto a recording medium on which a plurality of music tracks as units of the audio data are grouped into at least one group and managed by management information, wherein the audio data file comprises fringe information for the at least one group; and
a controller for:
generating a first image file comprising a first image associated with at least one music track from the plurality of music tracks recorded on said recording medium,
generating a second image file comprising a second image associated with the at least one group,
generating a third file comprising:
at least one first descriptor identifying a start address and an end address in the audio data file of at least one part of the at least one music track associated with the first image and a first link indicating at least one other descriptor identifying at least one other part of the at least one music track, and
at least one second descriptor comprising a start address and an end address in the audio data file of at least one part of the fringe information for the at least one group, and
recording said first image file and the second image file onto said recording medium by said recorder, wherein:
the first image file includes at least one first identifier associating the at least one part of the at least one music track with the at least one first descriptor, and
the second image file includes at least one second identifier associating the at least one part of the fringe information with the at least one second descriptor.

9. A reproducing device comprising:
a reproducer for reproducing data from an optical recording medium having recorded thereon:
an audio data file comprising audio data and fringe information, the audio data comprising at least one music track that is grouped into at least one group and managed by management information;
an image file comprising:
a first image associated with the at least one music track, and
a second image associated with the at least one group managed by said management information; and
a track index file comprising:
at least one first identifier identifying a start address and an end address within the audio data file of at least one part of the at least one music track, and
at least one second identifier identifying a start address and an end address within the audio data file of at least one part of the fringe information about the at least one group, wherein the fringe information comprises the at least one second image;
a buffer memory for, in response to loading the optical recording medium into the reproducer, buffering in advance, at a first time, the image file and the track index recorded on said optical recording medium;
a display; and
a controller for:
reading said image file and the track index file from said optical recording medium by said reproducer and controlling storing said image file in said buffer memory, and
in response to reading by said reproducer the audio data file directly from said optical recording medium at a second time that is different from the first time, reading the track index file and the image file from the buffer memory to extract the first image associated with the at least one music track to be reproduced and the second image associated with the at least one group and causing said display to display at least one of the first image and second image.

10. The recording device of claim 1, wherein the recording device is configured to function as an audio player and a camera.

11. The recording device of claim 1, wherein the audio data is downloaded from a computer connected to the recording device.

12. The recording device of claim 1, wherein the at least one first identifier comprises an identifier for at least one descriptor identifying the start address and the end address of the at least one part of the at least one music piece in the audio data.

13. The recording device of claim 12, wherein the at least one descriptor includes a link to a next part of the at least one music piece in the audio data.

14. The recording device of claim 1, wherein the audio data includes image information relating to the second image data corresponding to the at least one group.

15. The recording device of claim 14, wherein the at least one first identifier comprises an identifier for at least one descriptor identifying the start address and the end address of the first thumbnail image information in the audio data and the at least one second identifier comprises an identifier for at least one descriptor identifying the start address and the end address of the fringe information in the audio data.

16. The recording device of claim 14, wherein the image information is at least one of a jacket image and a description of the at least one group.

17. The reproducing device of claim 4, wherein the image file is read from the buffer memory means in advance prior to reproducing the at least one music track by the reproducing means.

18. A method of claim 6, wherein the image file is stored in a buffer memory in advance prior to reproducing the at least one music track and, when the at least one music track is reproduced, the first thumbnail image associated with the at least one track is extracted from the buffer memory.

19. The recording device of claim 8, wherein the first and second image data is downloaded from a computer connected to the recording device.

20. The reproducing device of claim 9, wherein the image file is read from the buffer memory in advance prior to reproducing the at least one music track by the reproducer.

* * * * *